(12) United States Patent
Chang et al.

(10) Patent No.: US 9,034,932 B1
(45) Date of Patent: May 19, 2015

(54) ZWITTERIONIC-BIAS MATERIAL FOR BLOOD CELL SELECTION

(71) Applicant: CHUNG-YUAN CHRISTIAN UNIVERSITY, Tao-Yuan (TW)

(72) Inventors: Yung Chang, Taipei (TW); Jheng-Fong Jhong, Taipei (TW); Sheng-Han Chan, Taipei (TW); Wen-Lin Lin, Taipei (TW)

(73) Assignee: CHUNG YUAN CHRISTIAN UNIVERSITY, Tao-Yuan (TW)

( * ) Notice: Subject to any disclaimer, the term of this patent is extended or adjusted under 35 U.S.C. 154(b) by 51 days.

(21) Appl. No.: 14/080,244

(22) Filed: Nov. 14, 2013

(51) Int. Cl.
*A61L 33/06* (2006.01)
*B01J 20/26* (2006.01)
*H01M 8/10* (2006.01)

(52) U.S. Cl.
CPC ............ *A61L 33/064* (2013.01); *B01J 20/264* (2013.01)

(58) Field of Classification Search
CPC ............ A61L 33/06; B01J 20/26; H01M 8/10
USPC ................ 521/25; 429/492; 427/115, 508
See application file for complete search history.

(56) References Cited

U.S. PATENT DOCUMENTS 5,407,581 A * 4/1995 Onodera et al. .............. 210/654

OTHER PUBLICATIONS

Zhang et al. "Preparation of the crosslinked polymer electrolyte membranes based on a hyperbranched poly(amidoamine) and their proton conductivity", School of Chemistry and Chemical Engineering, State Key Laboratory of Metal Matrix Composites, Shanghai Jiao Tong University, Shanghai, 200240, Peop. Rep. China, e-Polymers (2010) (STIC Search, pages.*
Chang et al. "Zwitterionic Sulfobetaine-Grafted Poly(vinylidene fluoride) Membrane with Highly Effective Blood Compatibility via Atmospheric Plasma-Induced Surface Copolymerization", ACS Appl. Mater. Interfaces 2011, 3, 1228-1237.*

* cited by examiner

*Primary Examiner* — Michael M Bernshteyn
(74) *Attorney, Agent, or Firm* — WPAT, PC; Justin King (57) ABSTRACT

The invention provides a zwitterionic-bias material for blood cell selection, being a copolymer formed by zwitterionic structural units and charged structural units wherein the zwitterionic structural unit comprises at least one positively charged moiety and one negatively charged moiety, a distance between the positively charged moiety and the negatively charged moiety is a length of 1~5 carbon-carbon bonds, and the zwitterionic structural units and charged structural units are randomly arranged to have zwitterionic-bias.

30 Claims, 2 Drawing Sheets

ZWITTERIONIC-BIAS MATERIAL FOR BLOOD CELL SELECTION

BACKGROUND OF THE INVENTION

1. Field of the Invention

The present invention is generally related to a zwitterionic-bias material, and more particularly to a zwitterionic-bias material for blood cell selection.

2. Description of the Prior Art

In general, leukocytes can be removed from blood, for example, by a fibrous type filter and besides the surface of such a leukocyte-removal filter medium is surface-treated to become positively charged because leukocytes and platelets are negatively charged. Thus, in addition to the sponge (porous) structure of the filter medium, the positively charged surface of the filter medium is also utilized to attract leukocytes and platelets. Besides, in order to avoid blood coagulation or platelet activation, usually a blood sample should be added with an anti-coagulant agent or the surface of the filter medium should be further surface-treated for anti-coagulation.

According to U.S. Pat. No. 5,407,581, a filter medium with a negatively charged surface for blood treatment is disclosed where fibrous PET (polyethylene terephthalate) is used as a substrate and a charged polymer is grafted on the surface of the substrate to have the fibrous PET (filter medium) be slightly negatively charged because a positively charged surface will cause the concentration increase of bradkinin to thereby result in inducing allergy during blood transfusion.

However, an eligible blood selection material should have selectivity among different types of blood cells but no blood coagulation or allergic response. In the prior report (U.S. Pat. No. 5,407,581), positively and negatively charged compounds can be used to obtain a surface showing positively charged, negatively charged, or neutral to have three types of charge representation but there are not only three types of blood responses to a material (or filter medium). Furthermore, for a neutral material (or filter medium), there is no charge at all or charge balance. That is, microscopic characteristics of a material (or filter medium), such as charge distribution in the case of charge balance, affect the blood response to a material. Therefore, developing a material having good blood cell selectivity is still an important subject.

SUMMARY OF THE INVENTION

In light of the above background, in order to fulfill the requirements of industries, one object of the present invention is to provide a zwitterionic-bias material for blood cell selection having different selectivity over platelets, erythrocytes, and leukocytes.

One object of the present invention is to provide a zwitterionic-bias material for blood cell selection by controlling the distance, distribution and ratio between charged moieties having different types of charges to fabricate a material having specific zwitterionic-bias so as to achieve the effect of blood cell selection.

Furthermore, one object of the present invention is to provide a zwitterionic-bias material for blood cell selection to separate leukocytes from a blood sample without causing blood coagulation and blockage of a filter.

Accordingly, the present invention discloses a zwitterionic-bias material for blood cell selection, being a copolymer formed by zwitterionic structural units and charged structural units wherein the zwitterionic structural unit comprises at least one positively charged moiety and one negatively charged moiety, a distance between the positively charged moiety and the negatively charged moiety is a length of 1~5 carbon-carbon bonds, and the zwitterionic structural units and charged structural units are randomly arranged to have zwitterionic-bias.

In one embodiment, the zwitterionic structural unit is derived from a monomer selected from the group consisting of the following or combination thereof:
zwitterionic phosphobetaine having the following general equation:

($R_1$=H or $CH_3$; $R_2$=O or NH; m=1~5; n=1~5), zwitterionic sulfobetaine having the following general equation:

($R_1$=H or $CH_3$; $R_2$=O or NH; m=1~5; n=1~5), and zwitterionic carboxybetaine having the following general equation:

($R_1$=H or $CH_3$; $R_2$=O or NH; m=1~5; n=1~5).
For example, it is derived from 2-methacryloyloxyethyl phosphorylcholine (phophobetaine methacrylate; PBMA) having the following structure:

[2-(Methacryloyloxy)ethyl]dimethyl(3-sulfopropyl)-ammonium hydroxide (sulfobetaine methacrylate, SBMA) having the following structure:

or
2-Carboxy-N,N-dimethyl-N-(2'-(methacryloyloxy)ethyl) ethanamin-ium inner salt (carboxybetaine methacrylate, CBMA) having the following structure:

In one embodiment, the charged structural unit comprises a positively charged structural unit or a negatively charged structural unit or both.

In one embodiment, the positively charged structural unit is derived from a monomer selected from the group consisting of the following or combination thereof:

primary amine (1° amine) having the following general equation:

($R_1$=H or $CH_3$; $R_2$=O or NH; m=1~5), secondary amine (2° amine) having the following general equation:

($R_1$=H or $CH_3$; $R_2$=O or NH; $R_3$=$CH_3$ or $CH(CH_3)_2$; m=1~5), tertiary amine (3° amine) having the following general equation:

($R_1$,=H or $CH_3$; $R_2$=O or NH; m=1~5), and quaternary ammonium salt (4° amine) having the following general equation:

($R_1$=H or $CH_3$; $R_2$=O or NH; m=1~5).

For example, it is derived from 2-aminoethyl methacrylate having the following structure:

N-Isopropylacrylamide having the following structure:

dimethylaminoethyl methacrylate having the following structure:

[2-(Methacryloyloxy)ethyl]trimethylammonium (TMA) having the following structure:

In one embodiment, the negatively charged structural unit is derived from a monomer selected from the group consisting of the following or combination thereof:

monomer with a sulfo moiety having the following general equation:

($R_1$=H or $CH_3$; $R_2$=O or NH; m=1~5) and monomer with a carboxyl moiety having the following general equation:

($R_1$=H or $CH_3$; $R_2$=O or NH; m=1~5).

For example, it is derived from 3-sulfopropyl methacrylate having the following structure:

2-carboxyethyl acrylate having the following structure:

In one embodiment, the zwitterionic-bias material has a positive zwitterionic-bias within a range of 5%~34% that has no activation effect to platelets. When a sum of the zwitterionic structural units (Z) and the positively charged structural units (P) is 100 mol %, a molar ratio of the zwitterionic structural units (Z) to the sum of the zwitterionic structural units and the positively charged structural units (Z/(Z+P)) is between 70~90 mol % and a molar ratio of the positively charged structural units (P) to the sum of the zwitterionic structural units and the positively charged structural units (P/(Z+P)) is between 30~10 mol %.

In one embodiment, the zwitterionic-bias material has a positive zwitterionic-bias within a range of 35%~75% that has activation effect to platelets. When a sum of the zwitterionic structural units (Z) and the positively charged structural units (P) is 100 mol %, a molar ratio of the zwitterionic structural units (Z) to the sum of the zwitterionic structural units and the positively charged structural units (Z/(Z+P)) is between 30~60 mol % and a molar ratio of the positively charged structural units (P) to the sum of the zwitterionic structural units and the positively charged structural units (P/(Z+P)) is between 70~40 mol %.

In one embodiment, the zwitterionic-bias material has a negative zwitterionic-bias within a range of 15%~59% that has no activation effect to platelets. When a sum of the zwitterionic structural units (Z) and the negatively charged structural units (N) is 100 mol %, a molar ratio of the zwitterionic structural units (Z) to the sum of the zwitterionic structural units and the negatively charged structural units (Z/(Z+N)) is between 51~80 mol % and a molar ratio of the negatively charged structural units (N) to the sum of the zwitterionic structural units and the negatively charged structural units (N/(Z+N)) is between 49~20 mol %.

In one embodiment, zwitterionic-bias material has a negative zwitterionic-bias within a range of 60%~90% that has activation effect to platelets. When a sum of the zwitterionic structural units (Z) and the negatively charged structural units (N) is 100 mol %, a molar ratio of the zwitterionic structural units (Z) to the sum of the zwitterionic structural units and the negatively charged structural units (Z/(Z+N)) is between 30~50 mol % and a molar ratio of the negatively charged structural units (N) to the sum of the zwitterionic structural units and the negatively charged structural units (N/(Z+N)) is between 70~50 mol %.

In one embodiment, the zwitterionic-bias material has a positive zwitterionic-bias within a range of 5%~34% that can filter a blood sample containing leukocytes to remove leukocytes from the blood sample without causing platelet activation. When a sum of the zwitterionic structural units (Z) and the positively charged structural units (P) is 100 mol %, a molar ratio of the zwitterionic structural units (Z) to the sum of the zwitterionic structural units and the positively charged structural units (Z/(Z+P)) is between 70~90 mol % and a molar ratio of the positively charged structural units (P) to the sum of the zwitterionic structural units and the positively charged structural units (P/(Z+P)) is between 30~10 mol %.

In one embodiment, in the zwitterionic structural units, the distance between the positively charged moiety and the negatively charged moiety is a length of 2~4 carbon-carbon bonds.

Furthermore, according to another embodiment of the present invention, a zwitterionic-bias material for blood cell selection, being a copolymer formed by positively charged structural units and negatively charged structural units wherein the positively charged structural units comprises at least one positively charged moiety, the negatively charged structural unit comprises at least one negatively charged moiety, and a distance between the positively charged moiety and the negatively charged moiety is a length of 1~5 carbon-carbon bonds, and the positively charged structural units and negatively charged structural units are randomly arranged to have zwitterionic-bias.

In one embodiment, the positively charged structural unit is derived from a monomer selected from the group consisting of the following or combination thereof:

primary amine (1° amine) having the following general equation:

($R_1$=H or $CH_3$; $R_2$=O or NH; m=1~5), secondary amine (2° amine) having the following general equation:

($R_1$=H or $CH_3$; $R_2$=O or NH; $R_3$=$CH_3$ or $CH(CH_3)_2$; m=1~5), tertiary amine (3° amine) having the following general equation:

($R_1$, =H or $CH_3$; $R_2$=O or NH; m=1~5), and quaternary ammonium salt (4° amine) having the following general equation:

($R_1$=H or $CH_3$; $R_2$=O or NH; m=1~5).
For example, it is derived from 2-aminoethyl methacrylate having the following structure:

N-Isopropylacrylamide having the following structure:

dimethylaminoethyl methacrylate having the following structure:

or
[2-(Methacryloyloxy)ethyl]trimethylammonium (TMA) having the following structure:

In one embodiment, the negatively charged structural unit is derived from a monomer selected from the group consisting of the following or combination thereof:
monomer with a sulfo moiety having the following general equation:

($R_1$=H or $CH_3$; $R_2$=O or NH; m=1~5) (for example, 3-sulfopropyl methacrylate having the following structure:

and
monomer with a caraboxyl moiety having the following general equation:

($R_1$=H or $CH_3$; $R_2$=O or NH; m=1~5) (for example, 2-carboxyethyl acrylate having the following structure:

In one embodiment, the zwitterionic-bias material has a positive zwitterionic-bias within a range of 15%~65% that has activation effect to platelets.

In one embodiment, the zwitterionic-bias material has a negative zwitterionic-bias within a range of 50%~80% that has no activation effect to platelets.

In one embodiment, the zwitterionic-bias material has a positive zwitterionic-bias within a range of 20%~70% that can filter a blood sample containing leukocytes to remove leukocytes from the blood sample without causing platelet activation.

According to the zwitterionic-bias material for blood cell selection of the present invention, the zwitterionic-bias material can be used in blood cell selection by controlling the distance, distribution and ratio between charged moieties with different types of charges to fabricate a material having specific zwitterionic-bias so as to achieve the effect of blood cell selection.

DESCRIPTION OF THE PREFERRED EMBODIMENTS

What is probed into the invention is a zwitterionic-bias material for blood cell selection. Detail descriptions of the structure and elements will be provided in the following in order to make the invention thoroughly understood. Obviously, the application of the invention is not confined to specific details familiar to those who are skilled in the art. On the other hand, the common structures and elements that are known to everyone are not described in details to avoid unnecessary limits of the invention. Some preferred embodiments of the present invention will now be described in greater detail in the following. However, it should be recognized that the present invention can be practiced in a wide range of other embodiments besides those explicitly described, that is, this invention can also be applied extensively to other embodiments, and the scope of the present invention is expressly not limited except as specified in the accompanying claims.

In the blood treatment application, the prior art (U.S. Pat. No. 5,407,581) disclosed a blood filter medium having a charged moiety where especially a slightly negatively charged surface of the filter medium is suitable for blood treatment with no allergic response. However, the inventors of the present invention found that the whole surface representation of a filter medium (positively charged, negatively charged or neutral surface) is not the major factor to affect the selectivity over various blood cells. That is, various blood cells have not only three types of selectivity to a surface of a filter medium. Furthermore, in the above report, a porous fibrous material such as PET (polyethylene terephthalate) fibers are used as a substrate of the filter medium and then the surface of the substrate is treated by grafting charged polymers to obtain a slightly negatively charged surface to achieve the purpose of avoiding allergic response.

However, the zwitterionic-bias material for blood cell selection according to the present invention can be used alone as a filter medium and does not need to be utilized together with a porous fibrous material like PET as its substrate. That is, the zwitterionic-bias material for blood cell selection according to the present invention itself is porous and does not need to have surface treatment. However, the zwitterionic-bias material for blood cell selection according to the present invention can be combined with polypropylene (PP) or PET fibers for the application of blood selection.

In a first embodiment of the present invention, a zwitterionic-bias material for blood cell selection is disclosed. The zwitterionic-bias material for blood cell selection is a copolymer formed by zwitterionic structural units and charged structural units wherein the zwitterionic structural unit comprises at least one positively charged moiety and one negatively charged moiety, a distance between the positively charged moiety and the negatively charged moiety is a length of 1~5 carbon-carbon bonds, and the zwitterionic structural units and charged structural units are randomly arranged to have zwitterionic-bias.

Although the zwitterionic structural unit in the zwitterionic-bias material for blood cell selection may have well-known antibiofouling effect, more importantly it provides the zwitterionic-bias characteristic by addition of positively and negatively charged moieties. An electrically neutral surface may be a surface having no charged moiety or a surface having charged moieties but being charge balance and the characteristics of a surface having charged moieties change with the distance between the positively charged moiety and the negatively charged moiety. Thus, the zwitterionic structural unit comprises at least one positively charged moiety and one negatively charged moiety and a distance between the positively charged moiety and the negatively charged moiety is a length of 1~5 carbon-carbon bonds. A usual carbon-carbon bond length is about 1.2~1.5 angstrom. Preferably, the distance between the positively charged moiety and the negatively charged moiety is a length of 2~4 carbon-carbon bonds (2.4~6 angstrom).

In one embodiment, the zwitterionic structural unit is derived from a monomer selected from the group consisting of the following or combination thereof:

zwitterionic phosphobetaine having the following general equation:

($R_1$=H or $CH_3$; $R_2$=O or NH; m=1~5; n=1~5) (for example 2-methacryloyloxyethyl phosphorylcholine (phophobetaine methacrylate; PBMA) having the following structure:

zwitterionic sulfobetaine having the following general equation:

($R_1$=H or $CH_3$; $R_2$=O or NH; m=1~5; n=1~5) (for example, [2-(Methacryloyloxy)ethyl]dimethyl(3-sulfopropyl)-ammonium hydroxide (sulfobetaine methacrylate, SBMA) having the following structure:

and
zwitterionic carboxybetaine having the following general equation:

($R_1$=H or $CH_3$; $R_2$=O or NH; m=1~5; n=1~5) (for example, 2-Carboxy-N,N-dimethyl-N-(2'-(methacryloyloxy)ethyl) ethanamin-ium inner salt (carboxybetaine methacrylate, CBMA) having the following structure:

In one embodiment, the charged structural unit comprises a positively charged structural unit or a negatively charged structural unit or both.

In one embodiment, the positively charged structural unit is derived from a monomer selected from the group consisting of the following or combination thereof:

primary amine (1° amine) having the following general equation:

($R_1$=H or $CH_3$; $R_2$=O or NH; m=1~5) (for example, 2-aminoethyl methacrylate having the following structure:

secondary amine (2° amine) having the following general equation:

($R_1$=H or $CH_3$; $R_2$=O or NH; $R_3$=$CH_3$ or $CH(CH_3)_2$; m=1~5) (for example, N-Isopropylacrylamide having the following structure:

tertiary amine (3° amine) having the following general equation:

($R_1$, =H or $CH_3$; $R_2$=O or NH; m=1~5) (for example, dimethylaminoethyl methacrylate having the following structure:

and
quaternary ammonium salt (4° amine) having the following general equation:

($R_1$=H or $CH_3$; $R_2$=O or NH; m=1~5) (for example, [2-(Methacryloyloxy)ethyl]trimethylammonium (TMA) having the following structure:

In one embodiment, the negatively charged structural unit is derived from a monomer selected from the group consisting of the following or combination thereof:

monomer with a sulfo moiety having the following general equation:

($R_1$=H or $CH_3$; $R_2$=O or NH; m=1~5) (for example, 3-sulfopropyl methacrylate having the following structure:

and
monomer with a carboxyl moiety having the following general equation:

($R_1$=H or $CH_3$; $R_2$=O or NH; m=1~5) (for example, 2-carboxyethyl acrylate having the following structure:

In one embodiment, the zwitterionic-bias material has a positive zwitterionic-bias within a range of 5%~34% that has no activation effect to platelets. When a sum of the zwitterionic structural units (Z) and the positively charged structural units (P) is 100 mol %, a molar ratio of the zwitterionic structural units (Z) to the sum of the zwitterionic structural units and the positively charged structural units (Z/(Z+P)) is between 70~90 mol % and a molar ratio of the positively charged structural units (P) to the sum of the zwitterionic structural units and the positively charged structural units (P/(Z+P)) is between 30~10 mol %.

The zwitterionic-bias is determined by XPS in the dry state from the spectral area ratio of the atomic percentage based on the N 1s of quaternary amine groups ($N^+$) (TMA) and the S 2p of sulfonated groups ($SO_3^-$) (SA) at the binding energy of approximately 399 and 168 eV, respectively. In other words, in the case of the zwitterionic-bias material comprising the positively charged monomer (for example, TMA) and the negatively charged monomer (for example, SA), the signal contributed by the quaternary amine groups ($N^+$) peaked at 399 eV and the signal contributed by sulfonated groups ($SO_3^-$) peaked at 168 eV are calculated by integrating the spectral area of the peak so as to use the spectral area ratio as the content of the positively charged monomer or the content of the negatively charged monomer in the zwitterionic-bias material.

In one embodiment, the zwitterionic-bias material has a positive zwitterionic-bias within a range of 35%~75% that has activation effect to platelets. When a sum of the zwitterionic structural units (Z) and the positively charged structural units (P) is 100 mol %, a molar ratio of the zwitterionic structural units (Z) to the sum of the zwitterionic structural units and the positively charged structural units (Z/(Z+P)) is between 30~60 mol % and a molar ratio of the positively charged structural units (P) to the sum of the zwitterionic structural units and the positively charged structural units (P/(Z+P)) is between 70~40 mol %.

In one embodiment, the zwitterionic-bias material has a negative zwitterionic-bias within a range of 15%~59% that has no activation effect to platelets. When a sum of the zwitterionic structural units (Z) and the negatively charged structural units (N) is 100 mol %, a molar ratio of the zwitterionic structural units (Z) to the sum of the zwitterionic structural units and the negatively charged structural units (Z/(Z+N)) is between 51~80 mol % and a molar ratio of the negatively charged structural units (N) to the sum of the zwitterionic structural units and the negatively charged structural units (N/(Z+N)) is between 49~20 mol %.

In one embodiment, zwitterionic-bias material has a negative zwitterionic-bias within a range of 60%~90% that has activation effect to platelets. When a sum of the zwitterionic structural units (Z) and the negatively charged structural units (N) is 100 mol %, a molar ratio of the zwitterionic structural units (Z) to the sum of the zwitterionic structural units and the negatively charged structural units (Z/(Z+N)) is between 30~50 mol % and a molar ratio of the negatively charged structural units (N) to the sum of the zwitterionic structural units and the negatively charged structural units (N/(Z+N)) is between 70~50 mol %.

In one embodiment, the zwitterionic-bias material has a positive zwitterionic-bias within a range of 5%~34% that can filter a blood sample containing leukocytes to remove leukocytes from the blood sample without causing platelet activation. When a sum of the zwitterionic structural units (Z) and the positively charged structural units (P) is 100 mol %, a molar ratio of the zwitterionic structural units (Z) to the sum of the zwitterionic structural units and the positively charged structural units (Z/(Z+P)) is between 70~90 mol % and a molar ratio of the positively charged structural units (P) to the sum of the zwitterionic structural units and the positively charged structural units (P/(Z+P)) is between 30~10 mol %.

According to a second embodiment of the present invention, a zwitterionic-bias material for blood cell selection is disclosed. The zwitterionic-bias material for blood cell selection is a copolymer formed by positively charged structural units and negatively charged structural units wherein the positively charged structural units comprises at least one positively charged moiety, the negatively charged structural unit comprises at least one negatively charged moiety, and a distance between the positively charged moiety and the negatively charged moiety is a length of 1~5 carbon-carbon bonds, and the positively charged structural units and negatively charged structural units are randomly arranged to have zwitterionic-bias.

The difference between the first and the second embodiments is that the second embodiment uses only positively charged structural units and negatively charged structural units to form the copolymer of the invention and makes the distance between the positively charged moiety and the negatively charged moiety be a length of 1~5 carbon-carbon bonds. For example, specific moieties are selected to synthesize the copolymer to let the positively charged structural units and negatively charged structural units be randomly arranged to have zwitterionic-bias.

In one embodiment, the positively charged structural unit is derived from a monomer selected from the group consisting of the following or combination thereof:

primary amine (1° amine) having the following general equation:

($R_1$=H or $CH_3$; $R_2$=O or NH; m=1~5) (for example, 2-aminoethyl methacrylate having the following structure:

secondary amine (2° amine) having the following general equation:

($R_1$=H or $CH_3$; $R_2$=O or NH; $R_3$=$CH_3$ or $CH(CH_3)_2$; m=1~5) (for example,
N-Isopropylacrylamide having the following structure:

tertiary amine (3° amine) having the following general equation:

($R_1$, =H or $CH_3$; $R_2$=O or NH; m=1~5) (for example, dimethylaminoethyl methacrylate having the following structure:

and
quaternary ammonium salt (4° amine) having the following general equation:

($R_1$=H or $CH_3$; $R_2$=O or NH; m=1~5) (for example, [2-(Methacryloyloxy)ethyl]trimethylammonium (TMA) having the following structure:

In one embodiment, the negatively charged structural unit is derived from a monomer selected from the group consisting of the following or combination thereof:
monomer with a sulfo moiety having the following general equation:

($R_1$=H or $CH_3$; $R_2$=O or NH; m=1~5) (for example, 3-sulfopropyl methacrylate having the following structure:

and
monomer with a carboxyl moiety having the following general equation:

($R_1$=H or $CH_3$; $R_2$=O or NH; m=1~5) (for example, 2-carboxyethyl acrylate having the following structure:

In one embodiment, the zwitterionic-bias material has a positive zwitterionic-bias within a range of 15%~65% that has activation effect to platelets.

In one embodiment, the zwitterionic-bias material has a negative zwitterionic-bias within a range of 50%~80% that has no activation effect to platelets.

In one embodiment, the zwitterionic-bias material has a positive zwitterionic-bias within a range of 20%~70% that can filter a blood sample containing leukocytes to remove leukocytes from the blood sample without causing platelet activation. Preferably, when a sum of the positively charged structural units (P) and the negatively charged structural units (N) is 100 mol %, a molar ratio of the positively charged structural units (P) to the sum of the positively charged structural units and the negatively charged structural units (P/(N+P)) is 80 mol % and a molar ratio of the negatively charged structural units (N) to the sum of the positively charged structural units and the negatively charged structural units (N/(N+P)) is 20 mol %

Example 1

A zwitterionic-bias material for blood cell selection (copolymer I: SAmTMAn) formed by positively charged structural units (TMA) and negatively charged structural units (SA) is synthesized where "m" and "n" represent the molar ratio of SA to TMA, respectively. For example, copolymer I:

SA8TMA2 represents the molar ratio of SA to TMA is 8:2. The same representation is also used in the following.

Figure 1:
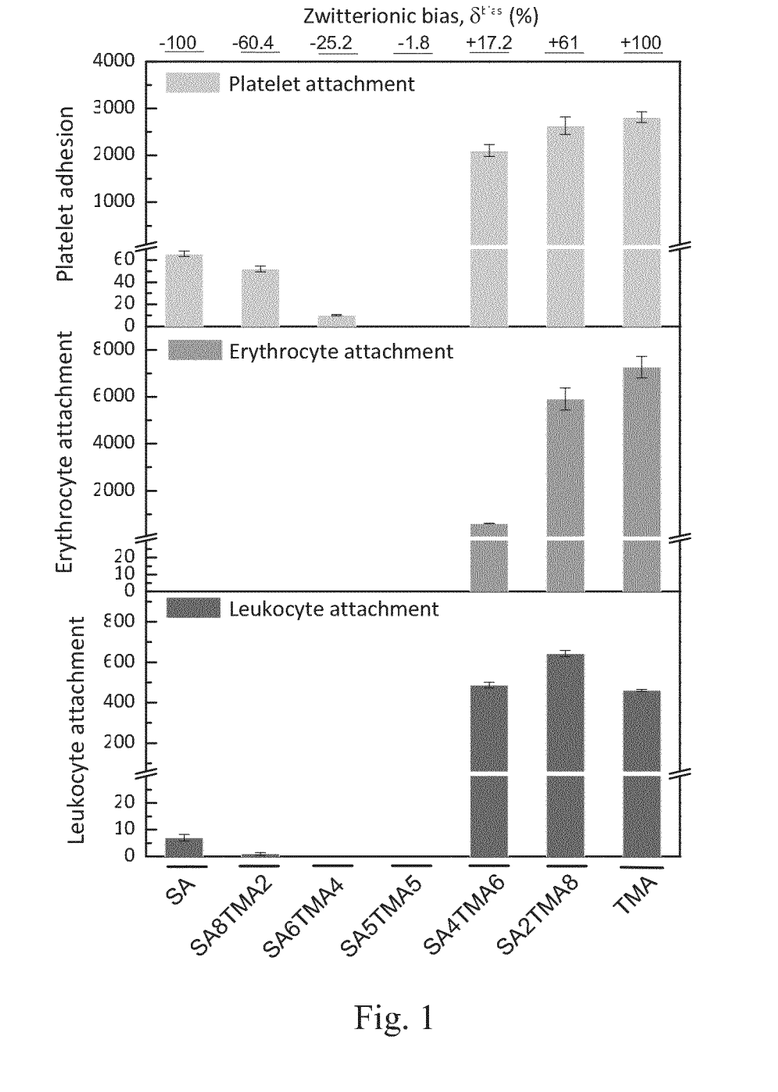
FIG. 1 shows a bar graph illustrating the experimental results of platelet, erythrocyte, and leukocyte adsorption with different zwitterionic-bias of the zwitterionic-bias material for blood cell selection (copolymers I) according to example 1 of the present invention.

TMA ([2-(Methacryloyloxy)ethyl]trimethylammonium chloride solution) and SA (3-Sulfopropyl methacrylate potassium salt) with a different molar ratio were taken and blended until uniform. Then, a crosslinking agent NMBA (N,N-Methylenebisacrylamide, 96% purchased from ACROS Co.) and an initiator APS (Ammonium peroxodisulfate purchased from Showa Chemical Co.) were added into the mixture of TMA and SA (monomer raw material) to make the mixture of TMA and SA be 90 wt %, NMBA be 8 wt %, and APS be 2 wt %. At room temperature (25° C.), monomers and the crosslinking agent underwent free radical polymerization. Finally, a catalyst TEMED (N,N,N',N'-Teramethylethylenediamine, 99% purchased from Alfa Aesar Co.) was added (1 wt %) to speed up the reaction. The reaction mixture was then taken out and placed in a mold for preparing copolymer I for being completely reacted to form copolymer I. After reacted for two hours, copolymer I was taken out to be dipped into deionized water and stored in a 4° C. refrigerator. Every 24 hours, deionized water was used to wash copolymer I three times to ensure cleanness of storage environment of copolymer I. The zwitterionic-bias and the diiodomethane contact angle of each copolymer I were shown in Table I. The diiodomethane contact angle was measured by using diiodomethane as a testing liquid, dropping a drop of the testing liquid on the surface of the copolymer to be tested, and observing the contact angle between the droplet and the surface of the copolymer I. The larger the contact angle is, the copolymer has a surface being more hydrophilic. The smaller the contact angle is, the copolymer has a surface being more hydrophobic. FIG. 1 shows a bar graph illustrating the experimental results of platelet, erythrocyte, and leukocyte adsorption with different zwitterionic-bias of the zwitterionic-bias material for blood cell selection (copolymers I) according to example 1 of the present invention.

TABLE I

| Copolymer I | Reaction ratio | | Molar ratio in copolymer | | zwitter- ionic- bias (%) | Diiodo- methane contact angle (°) |
|---|---|---|---|---|---|---|
| | SA | TMA | SA | TMA | | |
| SA10TMA0 | 100 | | 100 | | −100 | 129.7 ± 0.9 |
| SA8TMA2 | 80 | 20 | 80.2 | 19.8 | −60.4 | 131 ± 2.5 |
| SA6TMA4 | 60 | 40 | 62.6 | 37.4 | −25.2 | 131.9 ± 2.5 |
| SA5TMA5 | 50 | 50 | 50.9 | 49.1 | −1.8 | 132.3 ± 1.4 |
| SA4TMA6 | 40 | 60 | 41.4 | 58.6 | +17.2 | 133 ± 1.8 |
| SA2TMA8 | 20 | 80 | 19.5 | 80.5 | +61 | 133.2 ± 2.5 |
| SA0TMA10 | | 100 | | 100 | +100 | 128.8 ± 1.3 |

Example 2

A zwitterionic-bias material for blood cell selection (copolymer II: SpTMAq or SpSAr) formed by zwitterionic structural units (SBMA) and positively charged structural units (TMA) or negatively charged structural units (SA) is synthesized where "p" and "q" in "SpTMAq" represent the molar ratio of SBMA to TMA, respectively, and "p" and "r" in "SpSAr" represent the molar ratio of SBMA to SA, respectively. For example, copolymer II: S8TMA2 represents the molar ratio of SBMA to TMA is 8:2 and copolymer II: S8SA2 represents the molar ratio of SBMA to SA is 8:2. The same representation is also used in the following.

Figure 2:
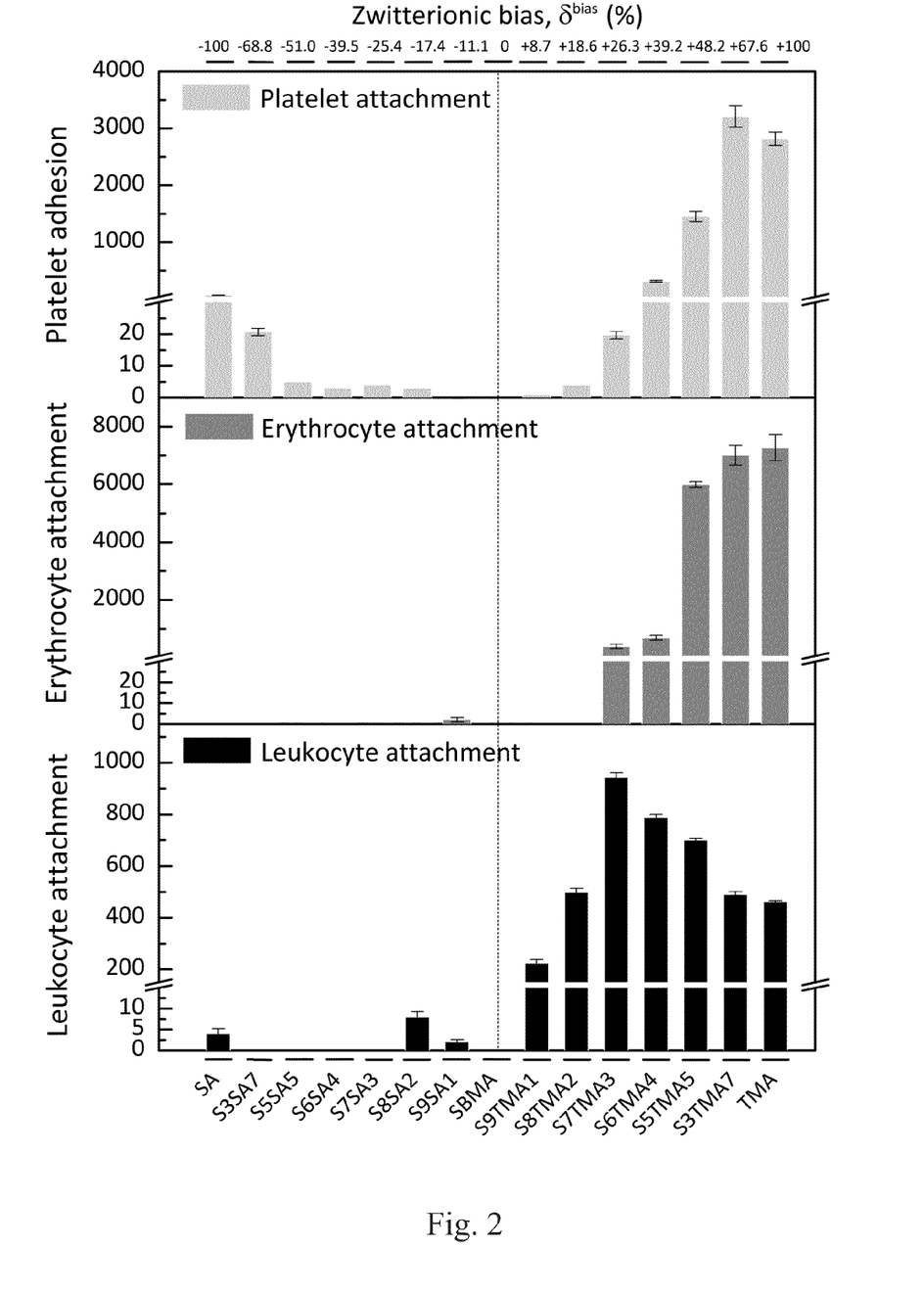
FIG. 2 shows a bar graph illustrating the experimental results of platelet, erythrocyte, and leukocyte adsorption with different zwitterionic-bias of the zwitterionic-bias material for blood cell selection (copolymers II) according to example 1 of the present invention.

SBMA (2-(Methacryloyloxy)ethyl]dimethyl(3-sulfopropyl)-ammonium hydroxide), TMA ([2-(Methacryloyloxy)ethyl]trimethylammonium chloride solution) or SA (3-Sulfopropyl methacrylate potassium salt) with a different molar ratio were taken and blended until uniform. Then, a crosslinking agent NMBA (N,N-Methylenebisacrylamide, 96% purchased from ACROS Co.) and an initiator APS (Ammonium peroxodisulfate purchased from Showa Chemical Co.) were added into the mixture of SBMA and TMA or the mixture of SBMA and SA (monomer raw material) to make the mixture of SBMA and TMA or the mixture of SBMA and SA be 90 wt %, NMBA be 8 wt %, and APS be 2 wt %. At room temperature (25° C.), monomers and the crosslinking agent underwent free radical polymerization. Finally, a catalyst TEMED (N,N,N',N'-Teramethylethylenediamine, 99% purchased from Alfa Aesar Co.) was added (1 wt %) to speed up the reaction. The reaction mixture was then taken out and placed in a mold for preparing copolymer II for being completely reacted to form copolymer II. After reacted for two hours, copolymer II was taken out to be dipped into deionized water and stored in a 4° C. refrigerator. Every 24 hours, deionized water was used to wash copolymer II three times to ensure cleanness of storage environment of copolymer II. The zwitterionic-bias and the diiodomethane contact angle of each copolymer II are shown in Table II. FIG. 2 shows a bar graph illustrating the experimental results of platelet, erythrocyte, and leukocyte adsorption with different zwitterionic-bias of the zwitterionic-bias material for blood cell selection (copolymers II) according to example 2 of the present invention.

TABLE II

| Copolymer II | Reaction ratio | | | Molar ratio in copolymer | | | zwitterionic bias (%) | Diiodomethane contact angle (°) |
|---|---|---|---|---|---|---|---|---|
| | SA | SBMA | TMA | SA | SBMA | TMA | | |
| SA | 100 | 0 | | 100 | 0 | | −100 | 129.1 ± 0.6 |
| S3SA7 | 70 | 30 | | 68.8 | 31.2 | | −68.8 | 126.1 ± 0.9 |
| S5SA5 | 50 | 50 | | 51.0 | 49.0 | | −51.0 | 121.5 ± 0.2 |
| S6SA4 | 40 | 60 | | 39.5 | 60.5 | | −39.5 | 124.2 ± 0.8 |
| S7SA3 | 30 | 70 | | 25.4 | 74.6 | | −25.4 | 126.7 ± 0.5 |
| S8SA2 | 20 | 80 | | 17.4 | 82.6 | | −17.4 | 126.2 ± 0.4 |
| S9SA1 | 10 | 90 | | 11.1 | 88.9 | | −11.1 | 125.8 ± 0.3 |
| SBMA | | 100 | | 0 | 100 | | 0 | 126.9 ± 0.3 |
| S9TMA1 | | 90 | 10 | | 91.3 | 8.7 | +8.7 | 124.7 ± 0.3 |
| S8TMA2 | | 80 | 20 | | 81.4 | 18.6 | +18.6 | 123.2 ± 0.9 |
| S7TMA3 | | 70 | 30 | | 73.7 | 26.3 | +26.3 | 126.3 ± 0.6 |

TABLE II-continued

| Copolymer II | Reaction ratio | | | Molar ratio in copolymer | | | zwitterionic bias (%) | Diiodomethane contact angle (°) |
|---|---|---|---|---|---|---|---|---|
| | SA | SBMA | TMA | SA | SBMA | TMA | | |
| S6TMA4 | | 60 | 40 | | 60.8 | 39.2 | +39.2 | 124.1 ± 0.4 |
| S5TMA5 | | 50 | 50 | | 51.8 | 48.2 | +48.2 | 125.1 ± 0.9 |
| S3TMA7 | | 30 | 70 | | 32.4 | 67.6 | +67.6 | 126.5 ± 1.9 |
| TMA | | 0 | 100 | | 0 | 100 | +100 | 128.8 ± 1.3 |

The platelet adsorption experiment was conducted by placing the hydrogel (copolymer I or II) in a 24-well culture plate, adding 1 mL of phosphate buffered solution (PBS) in each well, and then placing in a 37° C. oven for 1 hr. The PBS solution was taken out. In order to avoid blood coagulation and promote platelet activation, 1 mM $Mg^{2+}$ and 2.5 mM $Ca^{2+}$ were added into platelet rich plasma (PRP). In each well, 1 mL of PRP was added. After reacting at 37° C. for 2 hr, PBS was used to wash 5 times to wash away platelets that do not adsorb on the surface of copolymers. Then, 1 mL of 2.5% glutaraldehyde solution was added into the 24-well culture plate and the solution was set for 24 hr in a 4□ refrigerator to fix the adsorbed platelets on the surface of the copolymers. The lutaraldehyde solution was taken out and the hydrogel (copolymer) was repeatedly rinsed by PBS. A freeze-dryer was used to dry the hydrogel (copolymer). After dried, the hydrogel (copolymer) was then fixed on a mounting plate by carbon tape and sputter-coated with gold prior to observation under SEM.

The erythrocyte adsorption experiment was conducted by placing the hydrogel (copolymer I or II) in a 24-well culture plate, adding 1 mL of phosphate buffered solution (PBS) in each well, and then placing in a 37° C. oven for 1 hr. The PBS solution was taken out and added with 1 mL of erythrocyte concentrate. The solution was then placed in a 37° C. oven for 2 hr and the erythrocyte concentrate was sucked out from the solution. PBS was used to wash out erythrocytes that do not adsorb. 1 mL of 2.5% glutaraldehyde solution was added and the solution was set for 24 hr in a 4□ refrigerator. Finally, a confocal laser scanning microscopy (CLSM) was used to observe the erythrocyte adsorption.

The leukocyte adsorption experiment was conducted by placing the hydrogel (copolymer I or II) in a 24-well culture plate, adding 1 mL of phosphate buffered solution (PBS) in each well, and then placing in a 37° C. oven for 1 hr. The PBS solution was taken out and added with 1 mL of leukocyte concentrate. The solution was then placed in a 37° C. oven for 2 hr and the leukocyte concentrate was sucked out from the solution. PBS was used to wash out leukocytes that do not adsorb. 1 mL of 2.5% glutaraldehyde solution was added and the solution was set for 24 hr in a 4° C. refrigerator. Finally, a confocal laser scanning microscopy (CLSM) was used to observe the leukocyte adsorption.

From the experimental results of platelet, erythrocyte, and leukocyte adsorption, it is found that the zwitterionic-bias material for blood cell selection can be synthesized to have proper or desired blood cell selectivity by controlling the zwitterionic-bias. Table III shows materials having different blood cell selectivity with different zwitterionic-bias. TMA and SA were used to prepare PP fiber membranes through a plasma grafting technique to have different SA-TMA bias ranges where PP fibers has a pore diameter of 30 μm, a fiber diameter of 2 μm, and a thickness of 0.5 mm. The membrane with a diameter of 2.5 cm was placed on a holder and 5 cc of human erythrocyte concentrate was forced to pass through the membrane by pressure. The filtering result is analyzed and evaluated based on the content of blood cells detected by LH780-COULTER® LH 780 Hematology Analyzer by Beckman Coulter Co. In Table III, the sample SA2TMA8 used in filtering erythrocyte concentrate has a leukocyte removal ratio of 99.98%, platelet recovery of 3.825% to be very useful in erythrocyte recovery of erythrocyte concentrate.

$$\text{Leukocyte\_removal\_ratio (\%)} = \frac{Lb - La}{Lb} \times 100$$

$$\text{Erythrocyte\_recovery\_ratio (\%)} = 100 - \frac{Eb - Ea}{Eb} \times 100$$

$$\text{Platelet\_recovery\_ratio (\%)} = 100 - \frac{Pb - Pa}{Pb} \times 100$$

Lb: quantity of leukocytes before filtered
La: quantity of leukocytes after filtered
Eb: quantity of erythrocytes before filtered
Ea: quantity of erythrocytes after filtered
Pb: quantity of platelets before filtered
Pa: quantity of platelets after filtered

TABLE III

| | Filtration Performance | | |
|---|---|---|---|
| Sample | Leukocyte removal ratio (%) | Erythrocyte recovery (%) | Platelet recovery (%) |
| SA10TMA0 | 85.665 | 85.52 | 5.325 |
| SA8TMA2 | 94.336 | 83.145 | 15.15 |
| SA7TMA3 | 80.2 | 88.362 | 18.254 |
| SA6TMA4 | 75.211 | 90.66 | 19.433 |
| SA5TMA5 | 70.335 | 92.33 | 45.333 |
| SA4TMA6 | 97.56 | 65.21 | 1.1 |
| SA3TMA7 | 95.21 | 66.72 | 2.447 |
| SA2TMA8 | 99.98 | 86.225 | 3.825 |
| SA0TMA10 | 96.72 | 43.227 | 0.18 |

Furthermore, the sample S7TMA3 (having maximum leukocyte adsorption ratio in FIG. 2) used in filtering platelet concentrate has platelet recovery of 99.1%, a leukocyte removal ratio of 99.15% to be very useful in platelet recovery of platelet concentrate.

The above examples are only used for illustration. Various changes can be made without deviating from the scope of the present invention.

In conclusion, according to the zwitterionic-bias material for blood cell selection of the present invention, the zwitterionic-bias material can be used in blood cell selection by controlling the distance, distribution and ratio between charged moieties with different types of charges to fabricate a material having specific zwitterionic-bias so as to achieve the effect of blood cell selection. That is, the zwitterionic-bias material for blood cell selection according to the present invention itself is porous and does not need to have surface treatment. However, the zwitterionic-bias material for blood cell selection according to the present invention can be combined with polypropylene (PP) or PET fibers for blood selection.

Obviously many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. A zwitterionic-bias material for blood cell selection, being a copolymer formed by zwitterionic structural units and charged structural units wherein the zwitterionic structural unit comprises at least one positively charged moiety and one negatively charged moiety, a distance between the positively charged moiety and the negatively charged moiety is a length of 1~5 carbon-carbon bonds, and the zwitterionic structural units and charged structural units are randomly arranged to have zwitterionic-bias.

2. The zwitterionic-bias material for blood cell selection according to claim 1, wherein the zwitterionic structural unit is derived from a monomer selected from the group consisting of the following or combination thereof:

zwitterionic phosphobetaine having the following general equation:

($R_1$=H or $CH_3$; $R_2$=O or NH; m=1~5; n=1~5), zwitterionic sulfobetaine having the following general equation:

($R_1$=H or $CH_3$; $R_2$=O or NH; m=1~5; n=1~5), and zwitterionic carboxybetaine having the following general equation:

($R_1$,=H or $CH_3$; $R_2$=O or NH; m=1~5; n=1~5).

3. The zwitterionic-bias material for blood cell selection according to claim 1, wherein the charged structural unit comprises a positively charged structural unit or a negatively charged structural unit or both.

4. The zwitterionic-bias material for blood cell selection according to claim 3, wherein the positively charged structural unit is derived from a monomer selected from the group consisting of the following or combination thereof:

primary amine (1° amine) having the following general equation:

($R_1$=H or $CH_3$; $R_2$=O or NH; m=1~5), secondary amine (2° amine) having the following general equation:

($R_1$=H or $CH_3$; $R_2$=O or NH; $R_3$=$CH_3$ or $CH(CH_3)_2$; m=1~5), tertiary amine (3° amine) having the following general equation:

($R_1$, =H or $CH_3$; $R_2$=O or NH; m=1~5), and quaternary ammonium salt (4° amine) having the following general equation:

($R_1$=H or $CH_3$; $R_2$=O or NH; m=1~5).

5. The zwitterionic-bias material for blood cell selection according to claim 3, wherein the negatively charged structural unit is derived from a monomer selected from the group consisting of the following or combination thereof:

monomer with a sulfo moiety having the following general equation:

($R_1$=H or $CH_3$; $R_2$=O or NH; m=1~5) and monomer with a carboxyl moiety having the following general equation:

($R_1$=H or $CH_3$; $R_2$=O or NH; m=1~5).

6. The zwitterionic-bias material for blood cell selection according to claim 3, wherein the zwitterionic-bias material has a positive zwitterionic-bias within a range of 5%~34% that has no activation effect to platelets.

7. The zwitterionic-bias material for blood cell selection according to claim 6, wherein, when a sum of the zwitterionic structural units (Z) and the positively charged structural units (P) is 100 mol %, a molar ratio of the zwitterionic structural units (Z) to the sum of the zwitterionic structural units and the positively charged structural units (Z/(Z+P)) is between 70~90 mol % and a molar ratio of the positively charged structural units (P) to the sum of the zwitterionic structural units and the positively charged structural units (P/(Z+P)) is between 30~10 mol %.

8. The zwitterionic-bias material for blood cell selection according to claim 3, wherein the zwitterionic-bias material has a positive zwitterionic-bias within a range of 35%~75% that has activation effect to platelets.

9. The zwitterionic-bias material for blood cell selection according to claim 8, wherein, when a sum of the zwitterionic structural units (Z) and the positively charged structural units (P) is 100 mol %, a molar ratio of the zwitterionic structural units (Z) to the sum of the zwitterionic structural units and the positively charged structural units (Z/(Z+P)) is between 30~60 mol % and a molar ratio of the positively charged structural units (P) to the sum of the zwitterionic structural units and the positively charged structural units (P/(Z+P)) is between 70~40 mol %.

10. The zwitterionic-bias material for blood cell selection according to claim 3, wherein the zwitterionic-bias material has a negative zwitterionic-bias within a range of 15%~59% that has no activation effect to platelets.

11. The zwitterionic-bias material for blood cell selection according to claim 10, wherein, when a sum of the zwitterionic structural units (Z) and the negatively charged structural units (N) is 100 mol %, a molar ratio of the zwitterionic structural units (Z) to the sum of the zwitterionic structural units and the negatively charged structural units (Z/(Z+N)) is between 51~80 mol % and a molar ratio of the negatively charged structural units (N) to the sum of the zwitterionic structural units and the negatively charged structural units (N/(Z+N)) is between 49~20 mol %.

12. The zwitterionic-bias material for blood cell selection according to claim 3, wherein the zwitterionic-bias material has a negative zwitterionic-bias within a range of 60%~90% that has activation effect to platelets.

13. The zwitterionic-bias material for blood cell selection according to claim 12, wherein, when a sum of the zwitterionic structural units (Z) and the negatively charged structural units (N) is 100 mol %, a molar ratio of the zwitterionic structural units (Z) to the sum of the zwitterionic structural units and the negatively charged structural units (Z/(Z+N)) is between 30~50 mol % and a molar ratio of the negatively charged structural units (N) to the sum of the zwitterionic structural units and the negatively charged structural units (N/(Z+N)) is between 70~50 mol %.

14. The zwitterionic-bias material for blood cell selection according to claim 3, wherein the zwitterionic-bias material has a positive zwitterionic-bias within a range of 5%~34% that can filter a blood sample containing leukocytes to remove leukocytes from the blood sample without causing platelet activation.

15. The zwitterionic-bias material for blood cell selection according to claim 14, wherein, when a sum of the zwitterionic structural units (Z) and the positively charged structural units (P) is 100 mol %, a molar ratio of the zwitterionic structural units (Z) to the sum of the zwitterionic structural units and the positively charged structural units (Z/(Z+P)) is between 70~90 mol % and a molar ratio of the positively charged structural units (P) to the sum of the zwitterionic structural units and the positively charged structural units (P/(Z+P)) is between 30~10 mol %.

16. The zwitterionic-bias material for blood cell selection according to claim 1, wherein, in the zwitterionic structural units, the distance between the positively charged moiety and the negatively charged moiety is a length of 2~4 carbon-carbon bonds.

17. A zwitterionic-bias material for blood cell selection, being a copolymer formed by positively charged structural units and negatively charged structural units wherein the positively charged structural units comprises at least one positively charged moiety, the negatively charged structural unit comprises at least one negatively charged moiety, and a distance between the positively charged moiety and the negatively charged moiety is a length of 1~5 carbon-carbon bonds, and the positively charged structural units and negatively charged structural units are randomly arranged to have zwitterionic-bias.

18. The zwitterionic-bias material for blood cell selection according to claim 17, wherein the positively charged structural unit is derived from a monomer selected from the group consisting of the following or combination thereof:

primary amine (1° amine) having the following general equation:

($R_1$=H or $CH_3$; $R_2$=O or NH; m=1~5), secondary amine (2° amine) having the following general equation:

($R_1$=H or $CH_3$; $R_2$=O or NH; $R_3$=$CH_3$ or $CH(CH_3)_2$; m=1~5), tertiary amine (3° amine) having the following general equation:

($R_1$, =H or $CH_3$; $R_2$=O or NH; m=1~5), and quaternary ammonium salt (4° amine) having the following general equation:

($R_1$=H or $CH_3$; $R_2$=O or NH; m=1~5).

19. The zwitterionic-bias material for blood cell selection according to claim 17, wherein the negatively charged structural unit is derived from a monomer selected from the group consisting of the following or combination thereof:
    monomer with a sulfo moiety having the following general equation:

($R_1$=H or $CH_3$; $R_2$=O or NH; m=1~5) and monomer with a carboxyl moiety having the following general equation:

($R_1$=H or $CH_3$; $R_2$=O or NH; m=1~5).

20. The zwitterionic-bias material for blood cell selection according to claim 17, wherein the zwitterionic-bias material has a positive zwitterionic-bias within a range of 15%~65% that has activation effect to platelets.

21. The zwitterionic-bias material for blood cell selection according to claim 17, wherein the zwitterionic-bias material has a negative zwitterionic-bias within a range of 50%~80% that has no activation effect to platelets.

22. The zwitterionic-bias material for blood cell selection according to claim 17, wherein the zwitterionic-bias material has a positive zwitterionic-bias within a range of 20%~70% that can filter a blood sample containing leukocytes to remove leukocytes from the blood sample without causing platelet activation.

23. The zwitterionic-bias material for blood cell selection according to claim 17, being grafted to polypropylene fibers for blood cell selection.

24. The zwitterionic-bias material for blood cell selection according to claim 1, wherein the zwitterionic structural unit is derived from sulfobetaine methacrylate.

25. The zwitterionic-bias material for blood cell selection according to claim 17, wherein, when a sum of the positively charged structural units (P) and the negatively charged structural units (N) is 100 mol %, a molar ratio of the positively charged structural units (P) to the sum of the positively charged structural units and the negatively charged structural units (P/(N+P)) is 80 mol % and a molar ratio of the negatively charged structural units (N) to the sum of the positively charged structural units and the negatively charged structural units (N/(N+P)) is 20 mol %.

26. The zwitterionic-bias material for blood cell selection according to claim 14, wherein, when a sum of the zwitterionic structural units (Z) and the positively charged structural units (P) is 100 mol %, a molar ratio of the zwitterionic structural units (Z) to the sum of the zwitterionic structural units and the positively charged structural units (Z/(Z+P)) is 70 mol % and a molar ratio of the positively charged structural units (P) to the sum of the zwitterionic structural units and the positively charged structural units (P/(Z+P)) is 30 mol %.

27. The zwitterionic-bias material for blood cell selection according to claim 1, wherein the zwitterionic structural unit is derived from
    2-methacryloyloxyethyl phosphorylcholine (phophobetaine methacrylate; PBMA) having the following structure:

[2-(Methacryloyloxy)ethyl]dimethyl(3-sulfopropyl)-ammonium hydroxide (sulfobetaine methacrylate, SBMA) having the following structure:

or

2-Carboxy-N,N-dimethyl-N-(2'-(methacryloyloxy)ethyl) ethanamin-ium inner salt (carboxybetaine methacrylate, CBMA) having the following structure:

28. The zwitterionic-bias material for blood cell selection according to claim 3, wherein the positively charged structural unit is derived from
    2-aminoethyl methacrylate having the following structure:

N-Isopropylacrylamide having the following structure:

dimethylaminoethyl methacrylate having the following structure:

or

[2-(Methacryloyloxy)ethyl]trimethylammonium (TMA) having the following structure:

29. The zwitterionic-bias material for blood cell selection according to claim 3, wherein the negatively charged structural unit is derived from 3-sulfopropyl methacrylate having the following structure:

or 2-carboxyethyl acrylate having the following structure:

30. The zwitterionic-bias material for blood cell selection according to claim 1, being grafted to polypropylene fibers for blood cell selection.

* * * * *